United States Patent [19]

Winton et al.

[11] Patent Number: 5,035,940
[45] Date of Patent: Jul. 30, 1991

[54] ALUMINUM-FLUOROPOLYMER LAMINATE

[75] Inventors: Robert A. Winton, Pineville; Eugene F. Christie, Charlotte, both of N.C.

[73] Assignee: Rexham Corporation, New York, N.Y.

[21] Appl. No.: 246,674

[22] Filed: Sep. 19, 1988

[51] Int. Cl.$^5$ .................... B32B 1/00; B32B 1/10; B32B 15/08

[52] U.S. Cl. .................... 428/174; 156/327; 428/421; 428/461; 428/463; 428/516

[58] Field of Search .................. 428/421, 458, 463, 31, 428/174, 422, 472, 461, 516; 523/171; 156/327, 333

[56] References Cited

U.S. PATENT DOCUMENTS

| | | | |
|---|---|---|---|
| 3,369,959 | 2/1968 | Noyes | 428/421 |
| 3,859,123 | 1/1975 | Vasta | 428/421 X |
| 3,916,075 | 10/1975 | Dimigen et al. | 428/472 X |
| 4,340,648 | 7/1982 | Conrady et al. | 428/463 X |
| 4,385,097 | 5/1983 | Isozaki et al. | 428/458 |
| 4,469,747 | 9/1984 | Sasaki et al. | 428/421 |
| 4,557,977 | 12/1985 | Memmer et al. | 428/421 |
| 4,678,819 | 7/1987 | Sasaki et al. | 523/171 |
| 4,686,135 | 8/1987 | Obayashi et al. | 428/421 X |
| 4,692,382 | 9/1987 | Schmitt et al. | 428/421 X |

FOREIGN PATENT DOCUMENTS 0159894 of 0000 European Pat. Off. .

OTHER PUBLICATIONS

L. B. Cohen, Zircoaluminate Coupling Agents as High Performance Adhesion Promoters, Cavedon Chemical Co., Inc., Woonsocket, Rhode Island.
L. B. Cohen, The Chemistry of Zircoaluminate Coupling Agents and Their Application in High Solids Coatings; Reprinted from High Solids Coatings Magazine, vol. 12, dated Mar. 1987, published by Technology Marketing Corporation, One Technology Plaza, Norwalk, Connecticut.
Dr. Peter J. Moles, Zirconium Compounds Find New Use in Surface Coatings, Magnesium Elektron Ltd., Manchester, England.
Evaluation of Cavco Mod Adhesion Promoters in Various Coatings Formulations, Magnesium Elektron, Inc., Cavedon Chemical Co., Inc., Jan. 6, 1988.
M. Stuart Jelenick, Acryloid, Thermoplastic Acrylic Ester Resins for Industrial Finishing, Rohm and Haas Company, 1983, Philadelphia, Pa.
Cavedon Chemical Co., Inc.; Specification Sheets; Cavco Mod APG-1, APG-2, APG-3; Cavco ModA, ARG; Cavco Mod C-1, C-1PM; Cavco Mod M, MPM, MPG; Cavco Mod F, FPM; Cavco Mod S, SPM; Cavco Mod and Cavco Mod C, CPM, CPG.

Primary Examiner—Thomas J. Herbert, Jr.
Attorney, Agent, or Firm—Bell, Seltzer, Park & Gibson

[57] ABSTRACT

The invention is an article formed of a metal substrate with a protective, weather-resistant, transparent film overlying the surface of the metal substrate. The film is formed of a polymer that contains vinylidene fluoride and which imparts weather resistant properties to the workpiece. An adhesive layer is positioned between the protective film and the metal substrate and bonds the protective film to the metal substrate. The adhesive layer comprises an acrylic resin adhesive and a zircoaluminate adhesion promoter which enhances the bond between metals such as aluminum and the vinylidene fluoride containing polymer.

27 Claims, 1 Drawing Sheet

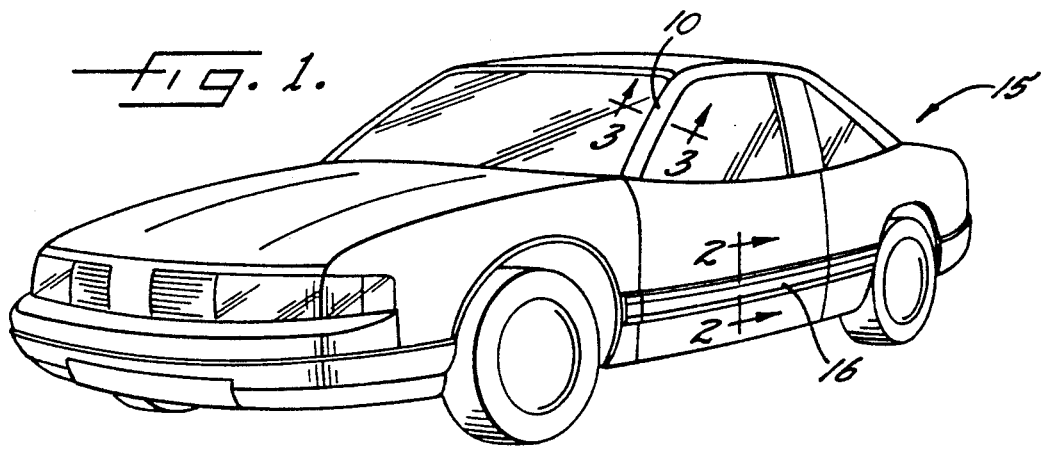
Fig. 1.
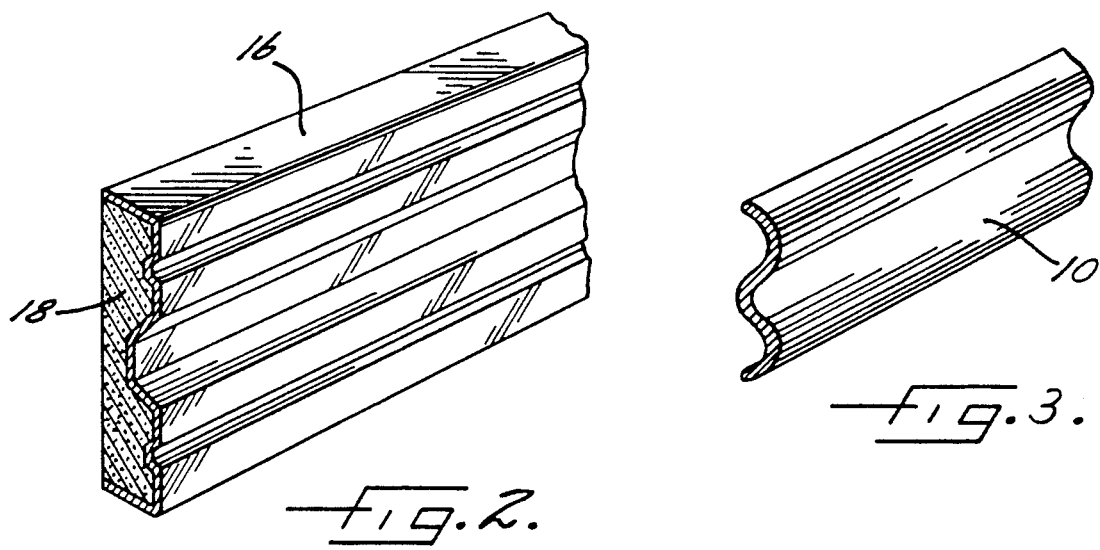
Fig. 2.
Fig. 3.
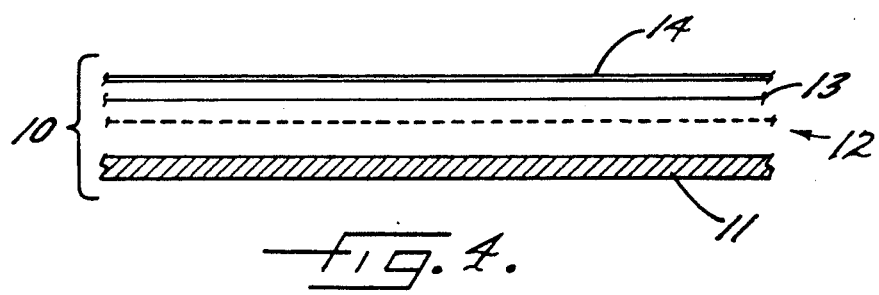
Fig. 4.

ALUMINUM-FLUOROPOLYMER LAMINATE

FIELD OF THE INVENTION

The present invention relates to articles having a metal surface appearance and in particular relates to a workpiece of a fluoropolymer film over a metal substrate such as sheet aluminum, which has a weather-resistant metal surface appearance.

BACKGROUND OF THE INVENTION

Polished or plated metal has been used for many years to provide durable and decorative surfaces in a number of applications. For example, chromium metal has been used to provide such a bright decorative surface to designated parts such as car bumpers and trim. Chromium is, however, being designed out of current applications because of its weight, uncertain availability and expense.

In a number of applications, other bright polished metals such as aluminum can provide a similar appearance to chromium while avoiding the weight, expense and uncertain availability associated with chromium. Aluminum is abundantly available, relatively light in weight, durable, and forms a protective coating of aluminum oxide about 50 angstroms thick which makes it highly resistant to ordinary corrosion.

Aluminum is, however, susceptible to attack by acids and bases, and polished aluminum surfaces do not resist weathering, but instead develop a milky appearance that generally results from the aluminum oxide coating. Because of aluminum's advantages in weight and durability, however, a number of techniques have been developed to attempt to protect aluminum, and these techniques have met with varying degrees of success.

One technique is chemical anodization which provides improved protection and the option of color tinting. Anodization, however, has not been demonstrated to result in long-term protection on exposed parts under many environmental conditions, and the use of the process itself is under increasing environmental pressure because of the problems associated with waste disposal requirements for the spent chemicals used in the surface anodization process. Anodization also tends to embrittle the aluminum, limiting the extent to which post-anodization forming techniques can be successfully used.

Another technique for protecting aluminum is the direct coating of the aluminum with a polymer. This generally provides some advantages over anodization in terms of protection. Typical polymer coating processes, however, require extensive solvent handling, followed by baking or curing of the polymer after its application. Furthermore, polymer coatings often either are or become brittle, may delaminate, and may show "orange peel," "cracking", "crazing", or "blushing" effects after exterior exposure. Coatings such as the clear vinyl coatings which are sometimes used to face a bright metal can also mold, mildew or stain.

Yet another technique is the lamination of a polymeric film to an aluminum surface using an adhesive. Such laminates can demonstrate some of the same theoretical advantages as polymer coatings. Typically, however, such laminates lack clarity, do not exhibit long-term bond durability, and exhibit poor formability. As will be understood to those familiar with the working of decorative metals, formability means that the finished metal may be worked, whether by stamping, pulling, or bending, without affecting the decorative surface. As is known to chemists, metallurgists, and engineers, one of the advantages of metals is their malleability, ductility, and flexibility. Accordingly, coatings or treatments of metals which will not withstand such metal-working techniques are inappropriate, disadvantageous, or even useless, depending upon the needed application. Other problems which such a surface treatment should address include adhesion, and resistance to heat, water, solvent, mechanical scrubbing and biological attack.

SUMMARY OF THE INVENTION

The present invention provides a bright metal surface with a film lamination that will withstand weather exposure without cracking, crazing or blushing, will exhibit water clarity, and will maintain its clarity and lamination when stamped, bent or drawn, which is suitable for tinting with pigments or dyes or both, and which avoids development of an objectionable surface appearance after typical environmental exposure.

More specifically, the present invention comprises a metal substrate with a protective weather-resistant surfacing layer overlying the surface of the metal substrate. The surfacing layer is formed of a polymer which contains vinylidene fluoride, and preferably comprises a film of the polymer. An adhesive layer is positioned between the protective film and the metal substrate and bonds the protective film to the metal substrate. The adhesive layer comprises an acrylic resin adhesive and a zircoaluminate adhesion promoter.

The foregoing and other objects and advantages of the invention will be more clearly understood when taken in conjunction with the detailed description and the accompanying drawings in which

DESCRIPTION OF DRAWINGS

FIG. 1 is a perspective view of an automobile, for which items according to the present invention can form useful decorative parts;

FIG. 2 is partial cross-sectional perspective view of an automobile body side molding taken along lines 2—2 of FIG. 1;

FIG. 3 is a partial cross-sectional perspective view of an automobile window trim strip taken along lines 3—3 of FIG. 1; and FIG. 4 is a schematic view of a laminate according to the present invention.

DETAILED DESCRIPTION

The invention comprises an article, broadly designated at 10 in FIG. 4, which has a metal surface appearance that is resistant to weathering. The article comprises a metal substrate Il which in a preferred embodiment is aluminum. The present invention can comprise metal substrates which have been polished, textured or brushed depending upon the desired final appearance, and can be formed of other metals in addition to aluminum. A protective weather-resistant surfacing layer, preferably a film 12, overlies the surface of the metal substrate and is formed of a polymer which contains vinylidene fluoride. As is known to those familiar with such materials, vinylidene fluoride polymer (or "polyvinylidene fluoride") is a polymer of 1,1-difluoroethylene ($H_2C=CF_2$). A particular preferred film for use in the present invention is formed of a polymer alloy of polyvinylidene fluoride and one or more other polymers such as acrylic polymers. One such suitable film is produced by Rexham Corporation industrial film division and identified by the trademark Fluorex A and is an alloy of polyvinylidene fluoride polymer and methylmethacrylate.

The polyvinylidene fluoride film provides primary protection to underlying materials, in this case the aluminum, from the direct affects of atmosphere, sunlight, solvents, pollution, moisture, and abrasion present in the elements to which such materials are exposed in an outdoor environment.

In order to join the polymer film of the present invention to the aluminum substrate, an adhesive layer 13 is positioned between the protective film and the metal substrate and bonds the protective film to the metal substrate, forming a laminate. The adhesive layer comprises an acrylic resin adhesive and a zircoaluminate adhesion promoter.

Acrylic polymers are thermoplastic polymers or copolymers of acrylic acid, methacrylic acid, esters of these acids, or acrylonitrile. Because one of the objects of the present invention is to provide and maintain a bright, metal surface appearance, acrylic adhesives are chosen for their clarity. In other words, the acrylic adhesive does not interfere with or obstruct the appearance of the metal or the polyvinylidene fluoride film. Moreover, in addition to being transparent to start with, the adhesive must remain transparent under the same conditions of manufacture, metal working and environmental exposure that the metal and film themselves must be exposed to. In this regard, only about one to five percent of all adhesives are colorless and transparent. Thus, a desirable adhesive must be flexible, colorless and transparent to both incident light and reflected light, must bond securely to the metal, must bond securely to the fluorinated polymer, and must maintain these properties under conditions of manufacture and environmental use.

Although they are excellent adhesives in many respects, acrylic adhesives generally will not, by themselves, form as good a bond as may be desired or necessary between materials as dissimilar as a metal and a fluoropolymer. Therefore, in order to obtain the desired properties, the adhesive layer of the present invention includes an adhesion promoter in addition to the acrylic resin. Adhesion promoters are chemical additives which, when added to an adhesive in a small quantity (typically less than two percent based on resin solids), greatly increase the work required to separate the adhering materials.

Zircoaluminate adhesion promoters are well suited to the purpose of promoting the adhesion of polyvinylidene fluoride and polyvinylidene fluoride alloys to metal substrates such as aluminum. In particular, zircoaluminate organo metallic adhesion promoters are surface modifiers which are hydrolytically and thermally stable coordinate covalent complexes which are dominated by aluminum and zirconium chemistry. The compositions are highly reactive with various metals and resins and thereby enhance the adhesion of coatings to metals. Zircoaluminates typically are formed of a zirconium building block, an aluminum building block, and an organic functional portion. In the present invention, preferred embodiments include amino functional zircoaluminate compounds supplied in a propylene glycol solvent, such as the promoter available from Cavedon Chemical Company, Inc. under the designation CAVCO MOD APG, and carboxy functional zircoaluminate compounds in propylene glycol--methyl ether solvent mixtures available from the same source under the designation CAVCO MOD CPM.

Preferably the adhesive also includes one or more ultraviolet light stabilizers. These stabilizers are useful because the polyvinylidene fluoride is transparent to ultraviolet light and the underlying metal is reflective to it. As a result, the adhesive and the adhesion promoter are both constantly exposed to both incident and reflected ultraviolet light in outdoor environmental applications. As known to those familiar with such materials, light stabilizers generally function by absorbing enough ultraviolet light to prevent significant or extensive interference with the adhesive or adhesion promoter by ultraviolet light, and by quenching the degradation reactions that ultraviolet light typically initiates in such materials. In one particular preferred embodiment of the invention, an absorbing type of molecule such as a benzophenone can be blended with a quenching type molecule such as a hindered amine to achieve the desired level of stabilization.

Nevertheless, it should be noted that the protective films of the laminates of the present invention can be pigmented, as well as transparent, although it will be understood that pigmented films, because they tend to block ultraviolet light, are not as sensitive to such exposure to ultraviolet light. Similarly, the films can include otherwise conventional additives and the adhesives can be mixed and applied using conventional solvents.

FIGS. 1 through 3 illustrates contoured articles such as automotive trim pieces according to the present invention. FIG. 2 shows a portion 16 of side panel trim formed of a metal sheet having a contoured, nonplanar configuration. The weather resistant protective transparent surfacing film formed of the vinylidene fluoride-containing polymer overlies and is coextensive with one surface of the contoured sheet. As in the other embodiments of the invention, a transparent acrylic resin adhesive and a zircoaluminate adhesion promoter bond the protective film to the metal sheet. A stabilizing filling material such as a polymer backing 18 is injection molded on the other surface of the metal sheet and serves to reinforce and maintain the shape of the contoured metal sheet. FIG. 3 is a larger view of a portion of the window molding 17 and illustrates how an article according to the present invention can be successfully formed along somewhat gentler contours than those illustrated in FIG. 2.

The invention further comprises the method of forming an article having the metallic surface appearance that is both weather-resistant and workable. Where a laminate is preferred, the method comprises laminating a protective vinylidene fluoride polymer film to the surface of the metal substrate using an acrylic resin adhesive which contains a zircoaluminate adhesion promoter.

In one embodiment, the method comprises applying the acrylic resin adhesive containing the zircoaluminate promoter to the surface of the vinylidene fluoride polymer film following which the protective film is laminated to the metal substrate with the adhesive therebetween. In such circumstances, the metal substrate can be in a heated condition when the protective film is being laminated thereto. In a preferred embodiment, the protective film is applied to the metal substrate by nipping the film onto the substrate with a nipping roll.

In another embodiment, the method of the invention comprises applying the acrylic resin adhesive containing the zircoaluminate adhesion promoter to the surface of the metal substrate following which the protective vinylidene fluoride polymer film is laminated to the surface of the metal substrate upon which the adhesive was applied. In this embodiment the protective film may be similarly laminated to the metal substrate while the metal substrate is in a heated condition and can be applied by nipping the film onto the substrate with a nipping roll.

In yet another embodiment, the finished article can be produced by applying a primer coating comprised of a dilute solution of an acrylic material and a zircoaluminate adhesion promoter to the surface of a metal substrate, then applying an acrylic resin adhesive to the surface of a film formed of a polymer which contains polyvinylidene fluoride, and then laminating the coated surface of the protective film to the primer-coated metal substrate. If desired, a small amount of the adhesion promoter may also be added to the resin adhesive. In such cases it is preferred to use a larger concentration of the promoter in the primer coating than in the acrylic resin adhesive. As in the previous embodiments, the protective film may be laminated to the metal substrate while the metal substrate is in a heated condition and by using a nipping roll.

It will be recognized those familiar with such materials that although the laminating of a film to a substrate is a convenient method of practicing the present invention, it is not the only method. In particular, another method comprises coating the acrylic adhesive and zircoaluminate adhesion promoter onto the metal substrate, over which the resin containing the polyvinylidene fluoride and acrylic polymers is then cast to form the film.

The following examples illustrate some of the preferred techniques, and the characteristics of the resulting products.

EXAMPLE I

An adhesive composition was prepared by mixing 114.9 grams of a methyl methacrylate copolymer supplied at 45 percent solids in toluene (Rohm and Haas B48S) with 44.9 grams of monopropylene glycol monomethyl ether (Union Carbide UCAR PM), 1.37 grams of an amino functional zircoaluminate adhesion promoter supplied in propylene glycol solvent (CAVCO MOD APG) and 0.23 grams of a hindered amine light stabilizer (T-292 from Ciba-Geigy). The adhesive was coated onto a bright chromate-treated aluminum panel using a No. 18 wire wound rod at a wet solid of 30 percent to yield dry coating thickness of 0.5 mils. The coated aluminum panel was dried for three minutes at 400° F. and quickly nip-bonded to 2 mil clear film of a vinylidene fluoride polymer/acrylic polymer alloy (Fluorex A from Rexham Corporation, Industrial Films Division, Matthews, North Carolina). The laminate was tested for bond strength and the bond of the Fluorox A film to the aluminum was found to be film destructive, meaning that when an effort is made to separate the film from the aluminum, the film fails before the bond does.

The coating was tested to determine its integrity during forming operations by using ball indentation (Gardener impact) to achieve approximately 18 percent metal elongation. Both direct and indirect impact showed no blushing or rupture of the clear film. The film was exposed to temperatures of 158° F. for three weeks, following which no lifting of the film from the impacted areas was observed.

The samples were also exposed to 2,000 hours of exposure in a carbon arc weatherometer, following which no change in gloss was observed (reading of 140 on a Gardener gloss meter with 60 head); no change in distinctiveness of image (DOI) was observed as measured on a Hunter Dorigon meter; no change in spectral reflectance was observed measured on a Hunter Dorigon meter; no significant color changes were observed (as measured on a Model 500 color computer from Applied Color Systems); and no change in visible appearance was observed. In comparison, samples of clear Fluorex A bonded with a blended adhesive of methyl methacrylate and bisphenol-A to a bright aluminum panel showed objectionable visual defects after this exposure. In particular, the aluminum exhibited the whitening characteristic of its oxidation, and the adhesive discolored, exhibiting a yellowish or brownish tint.

The samples were also exposed in a UV-CON weatherometer for 2,000 hours with the same favorable results as observed in the carbon arc weatherometer.

The samples were also exposed to 300 hours of condensing humidity (95° F., 95 percent relative humidity) followed by 300 hours in a salt spray corrosive environment. These samples showed no visual change and no loss of bond when cut with a cross-hatch pattern and then tape tested with 3M tape No. 710.

Finally, the samples were tested by bending the metal and film laminate back on itself with the film on the outside surface (a zero T-bend) and showed no blushing or cracking.

EXAMPLE II

An adhesive composition was formed from 115.02 grams of the methyl methacrylate copolymer, 43.81 grams of the monopropylene glycol monomethylether, and 0.51 grams of the hindered amine stabilizer, all as set forth in Example I. To these were added 0.11 grams of an antioxidant (I1010 by Ciba-Geigy) and 0.22 grams of a carboxy functional zircoaluminate adhesion promoter supplied in a propylene glycol and methyl ether solvent (CAVCO MOD. CPM).

A primer was formed of 4.71 grams of the methyl methacrylate copolymer, 50.3 grams of the monopropylene glycol monomethylether solvent, 0.61 grams of the zircoaluminate adhesive promoter, and 0.02 grams of the antioxidant.

In this example, bright chromate treated aluminum was coated with the described primer by hand-wiping using a saturated tissue. The sample was dried at 475° F. for 1 minute. The adhesive mixture was then applied to the primer using a No. 18 wire wound rod to spread the adhesive and the film was laminated to the surface. The sample was dried at 400° F. for 2.5 minutes. The sample was tested as in Example I. The bond was film-destructive, and the sample exhibited all of the properties noted with respect to Example I.

EXAMPLE III

The preparation and application of the adhesive mixture, primer mixture, and laminated film of Example II were identically repeated on bright, clear non-chromate treated aluminum. The bond was again observed to be film destructive, and the properties of the sample were substantially identical to those of Example I and Example II.

EXAMPLE IV

An adhesive was formed by mixing 20 grams methyl methacrylate copolymer supplied as dried pellets, 23.89 grams of toluene, 17.83 grams of the monopropylene glycol monomethylether solvent, 0.6 grams of the amino functional zircoaluminate promoter in propylene glycol solvent, and 0.12 grams of the hindered amine stabilizer. This adhesive was applied to bright chromate-treated aluminum to which the polyvinylidene-containing film was then laminated. A film-destructive bond was formed between the film and the aluminum and exhibited substantially all of the properties set forth with respect to Examples I–III.

The foregoing description and examples have been set forth by way of explanation and not by way of limitation, the scope of the invention being set forth in the following claims.

That what is claimed is:

1. A contoured article such as an automotive trim piece having a metal surface appearance that is resistant to weathering, and comprising:
    a metal sheet having a contoured, nonplanar configuration;
    a weather resistant protective transparent surfacing film formed of a vinylidene fluoride-containing polymer overlying and coextensive with one surface of said metal sheet;
    a transparent adhesive disposed between and bonding said protective film to said metal sheet, said transparent adhesive being formed of an acrylic resin adhesive na a zircoaluminate adhesion promoter; and
    a polymer backing bonded to the other surface of said metal sheet and serving to reinforce and maintain the shape of the contoured metal sheet.

2. An article having a metal surface appearance that is resistant to weathering, comprising:
    a sheet metal substrate;
    a protective weather resistant surfacing layer laminated to the surface of said sheet metal substrate and formed of a preformed film of a vinylidene fluoride-containing polymer; and
    an adhesive layer positioned between said protective surfacing layer and said metal substrate adhering said protective surfacing layer to said metal substrate, said adhesive layer comprising an acrylic resin adhesive and a zircoaluminate adhesion promoter.

3. An article according to claim 2 wherein said metal substrate comprises aluminum.

4. An article according to claim 2 wherein said protective surfacing layer is transparent.

5. An article according to claim 2 wherein said protective surfacing layer is pigmented.

6. An article according to claim 2 wherein said adhesion promoting layer further comprises an ultraviolet light stabilizer.

7. An article according to claim 2 wherein said metal substrate has a polished surface.

8. An article according to claim 2 wherein said metal substrate has a textured surface.

9. An article according to claim 8 wherein said textured surface is a brushed surface.

10. A laminate having a metal surface appearance that is resistant to weathering, comprising:
    a sheet metal substrate; and
    a weather resistant protective transparent film formed of a vinylidene fluoride-containing polymer overlying and coextensive with one surface of said sheet metal substrate and bonded thereto with an adhesive layer;
    said adhesive layer being formed of an acrylic resin adhesive and a zircoaluminate adhesion promoter.

11. A laminate according to claim 10 wherein said adhesive layer further comprises an ultraviolet light stabilizer.

12. A laminate according to claim 10 wherein said metal substrate comprises aluminum.

13. A laminate having a bright polished metal appearance that is resistant to weathering, comprising:
    a polished aluminum sheet;
    a transparent weather resistant protective surfacing film overlying one surface of said aluminum sheet and formed of polyvinylidene fluoride and acrylic polymer alloy; and
    a transparent adhesive disposed between and bonding said protective film to said aluminum sheet, said transparent adhesive being formed of an acrylic resin adhesive and a zircoaluminate adhesion promoter.

14. A sheet material according to claim 13 wherein said adhesive layer further comprises a hindered amine light stabilizer.

15. A laminate according to claim 13 wherein said adhesive layer further comprises a benzophenone light stabilizer.

16. A laminate according to claim 13 wherein said adhesive layer further comprises a blend to stabilizers which both absorb ultraviolet light and quench degradation reactions caused by ultraviolet light.

17. A method of forming a laminated article having a metal surface appearance that is both weather resistant and workable, the method comprising laminating a protective film formed of a vinylidene fluoride-containing polymer to the surface of a metal substrate using an acrylic resin adhesive which contains a zircoaluminate adhesion promoter.

18. A method according to claim 17 wherein the step of laminating the protective film to the metal substrate comprises
    a) applying the acrylic resin adhesive containing the zircoaluminate adhesion promoter to the surface of the protective polymer film; and
    b) laminating the protective film to the metal substrate with the adhesive therebetween to thereby bond the protective film to the metal substrate.

19. A method according to claim 18 wherein the step of laminating the protective film to the metal substrate is performed while the metal substrate is in a heated condition.

20. A method according to claim 18 wherein the step of laminating the protective film to the metal substrate comprises nipping the film onto the substrate with a nipping roll.

21. A method according to claim 17 wherein the step of laminating the protective film to the metal substrate comprises
    a) applying the acrylic resin adhesive containing the zircoaluminate adhesion promoter to the surface of the metal substrate; and
    b) laminating the protective vinylidene fluoride polymer film to the surface of the metal substrate upon which the adhesive was applied.

22. A method according to claim 21 wherein the step of laminating the protective film to the metal substrate is performed while the metal substrate is in a heated condition.

23. A method according to claim 21 wherein the step of laminating the protective film to the metal substrate comprises nipping the film onto the substrate with a nipping roll.

24. A method of forming a finished article having a metal surface appearance that is both weather resistant and workable, the method comprising:
  a) coating the surface of a metal substrate with a primer composition comprising an acrylic polymer and a zircoaluminate adhesion promoter;
  b) applying an acrylic resin adhesive to the surface of a film formed of a vinylidene fluoride-containing polymer; and
  c) laminating the adhesive coated surface of the protective film to the primer coated surface of the metal substrate.

25. A method according to claim 24 wherein the step of laminating the protective film to the metal substrate is performed while the metal substrate is in a heated condition.

26. A method according to claim 24 wherein the step of applying an acrylic resin adhesive comprises applying an acrylic resin adhesive which contains a zircoaluminate adhesion promoter.

27. A method according to claim 24 wherein the step of coating the surface of the metal substrate with a primer composition comprises coating the surface with a primer composition in which the concentration of zircoaluminate adhesion promoter is greater than the concentration of zircoaluminate adhesion promoter in the acrylic resin adhesive.

* * * * *